No. 12,256. REISSUED AUG. 9, 1904.

R. W. SCOTT.

KNITTING MACHINE.

APPLICATION FILED APR. 13, 1904.

5 SHEETS—SHEET 1.

Witnesses:
Frank L. A. Graham
Titus N. Irons.

Inventor:
Robert W. Scott,
by his Attorneys
Howson & Howson

No. 12,256. REISSUED AUG. 9, 1904.

R. W. SCOTT.

KNITTING MACHINE.

APPLICATION FILED APR. 13, 1904.

5 SHEETS—SHEET 2.

Witnesses:
Frank L. Graham
Titus W. Fons.

Inventor:
Robert W. Scott,
by his Attorneys,
Howson & Howson

No. 12,256. REISSUED AUG. 9, 1904.

R. W. SCOTT.

KNITTING MACHINE.

APPLICATION FILED APR. 13, 1904.

5 SHEETS—SHEET 3.

Witnesses:
Louis H. Buck.
Titus H. Fords.

Inventor:
Robert W. Scott.
by his Attorneys
Howson & Howson

No. 12,256. REISSUED AUG. 9, 1904.

R. W. SCOTT.

KNITTING MACHINE.

APPLICATION FILED APR. 13, 1904.

5 SHEETS—SHEET 4.

Witnesses:
Louis H. Buck
Titus W. Lowe.

Inventor:
Robert W. Scott.
by his Attorneys,
Howson & Howson

No. 12,256. REISSUED AUG. 9, 1904.

R. W. SCOTT.

KNITTING MACHINE.

APPLICATION FILED APR. 13, 1904.

5 SHEETS—SHEET 5.

Witnesses:-
Louis H. Pack.
Titus H. Irons.

Inventor:
Robert W. Scott,
by his Attorneys
Howson & Howson

No. 12,256. Reissued August 9, 1904.

UNITED STATES PATENT OFFICE.

ROBERT W. SCOTT, OF PHILADELPHIA, PENNSYLVANIA, ASSIGNOR OF ONE-HALF TO LOUIS N. D. WILLIAMS, OF ASHBOURNE, PENNSYLVANIA.

KNITTING-MACHINE.

SPECIFICATION forming part of Reissued Letters Patent No. 12,256, dated August 9, 1904.

Original No. 607,002, dated July 5, 1898. Application for reissue filed April 13, 1904. Serial No. 202,995.

*To all whom it may concern:*

Be it known that I, ROBERT W. SCOTT, a citizen of the United States, residing in Philadelphia, Pennsylvania, have invented certain Improvements in Knitting-Machines, of which the following is a specification.

My invention consists of a machine for the production of a shaped or fashioned knitted web in which the widening-wales are introduced without the necessity of transferring stitches from needle to needle and without the formation of eyelet-holes or gaps in the knitted web at the points where the widening-wales are begun.

Figure 1:
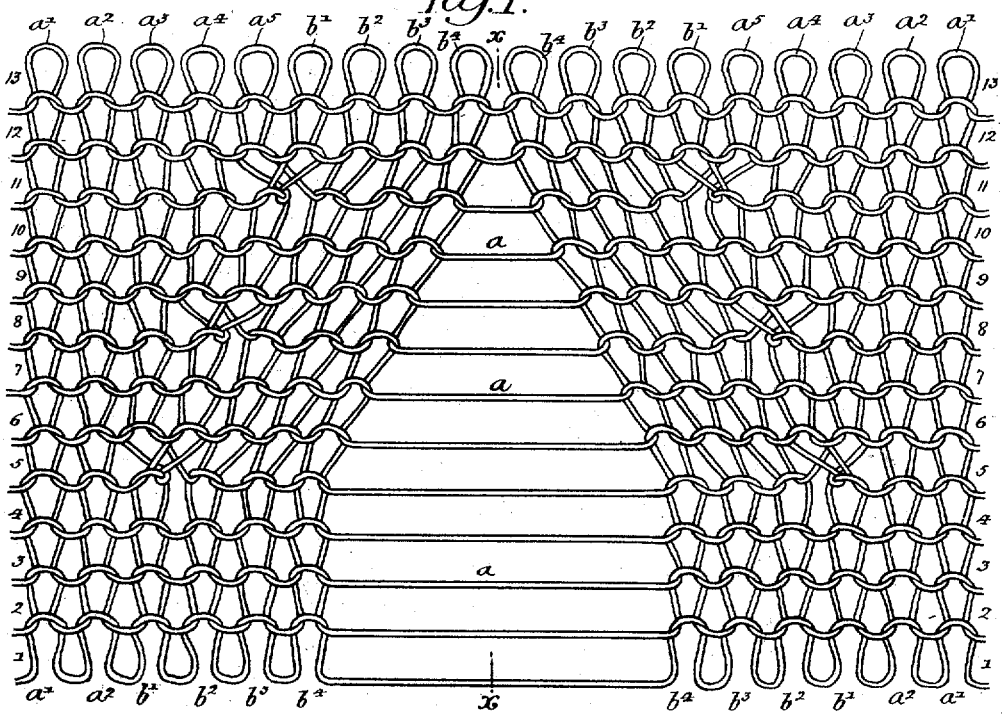
Figure 4:
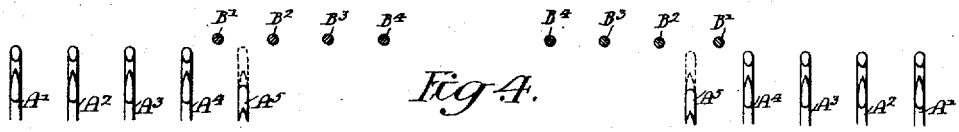
Figure 5:
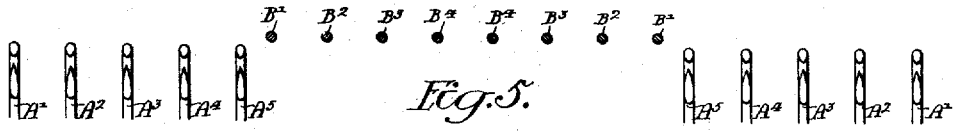
Figure 6:
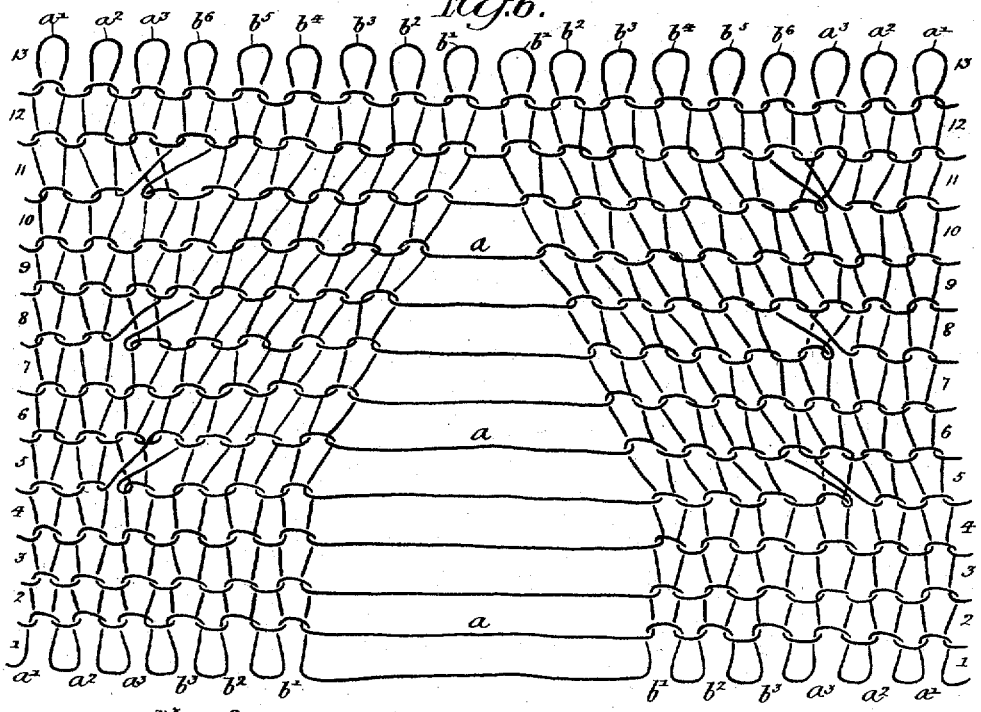
Figure 14:
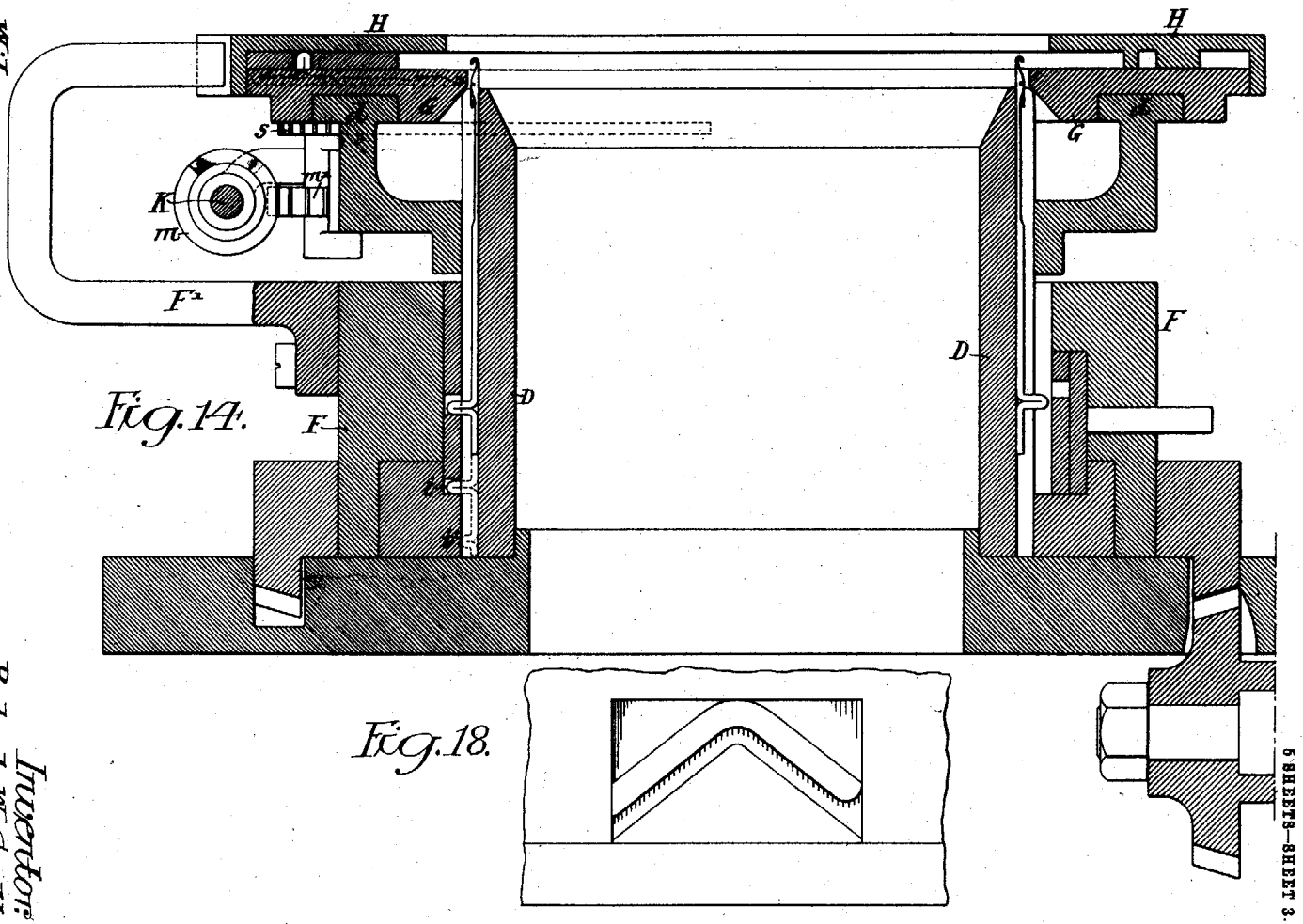
Figure 15:
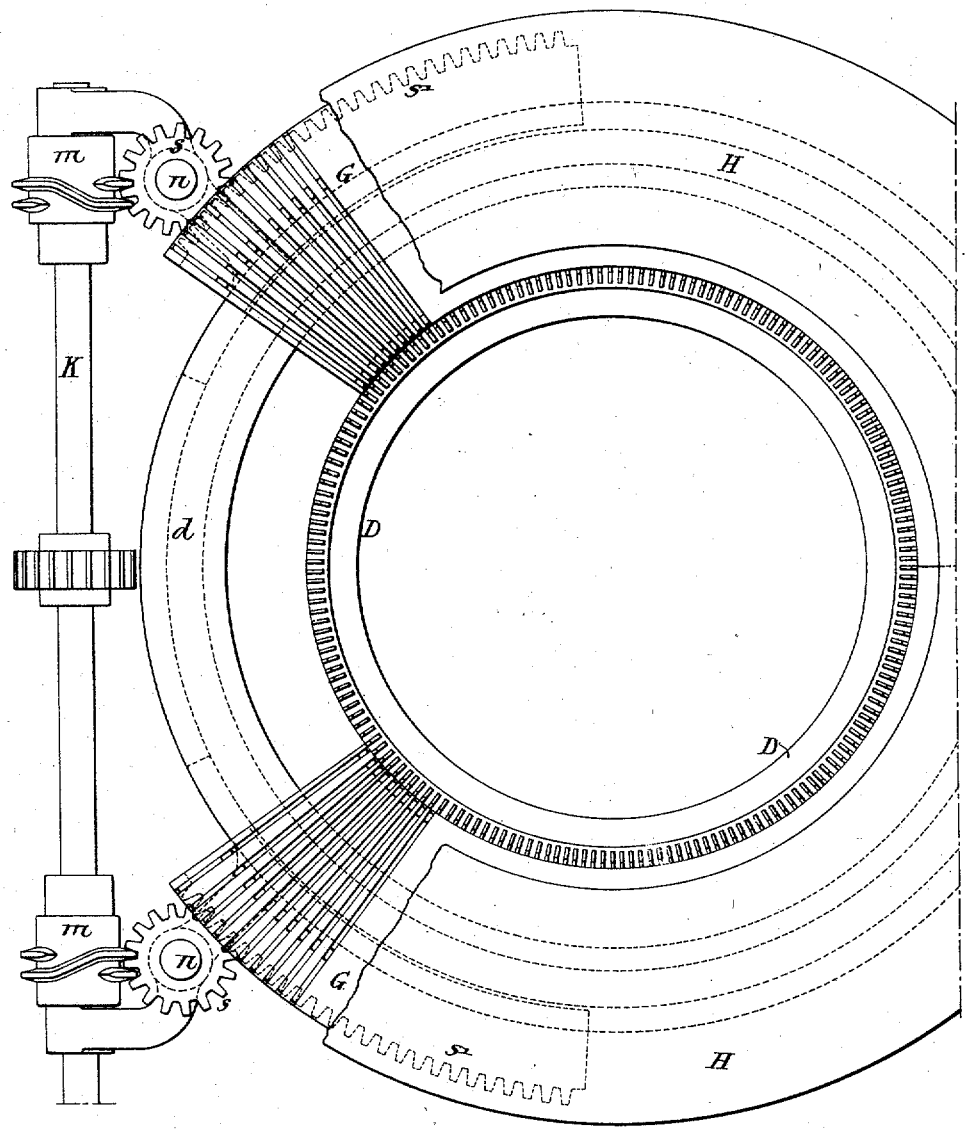

In the accompanying drawings, Figure 1 is an exaggerated diagram of a knitted web capable of being produced upon the machine. Figs. 2, 3, 4, and 5 are diagrams illustrating the manipulation of the needles employed in knitting said web. Fig. 6 is a view of a modified form of the web. Figs. 7 to 13, inclusive, are diagrams illustrating the manipulation of the needles resorted to in producing said modified form of web. Fig. 14 is a vertical sectional view of the machine for knitting the web shown in Fig. 1. Fig. 15 is a plan view of said machine with parts broken away to show those beneath, and Figs, 16, 17, 18, and 19 are views of cam structures forming part of the machine.

I will first describe the knitted webs illustrated in Figs. 1 and 6 and the methods of producing the same.

In Fig. 1 I have shown thirteen successive courses of a web into which six widening-wales have been introduced, three on each side of the central line $x$. Thus it will be seen that in the first, second, third, and fourth courses of the web each side of the latter is composed of six wales, (lettered, respectively, $a'$ $a^2$ and $b'$, $b^2$, $b^3$, and $b^4$,) an additional wale, $a^3$, being introduced in the fifth course, a second additional wale, $a^4$, being introduced in the eighth course, and a third additional wale, $a^5$, being introduced in the eleventh course. The opposite portions of the web in the first, second, third, and fourth courses are separated by floating threads $a$, and the length of these floating threads is gradually diminished as the opposite portions of the web are widened by the introduction of the additional wales until finally the two portions of the web join and form a continuous fabric. The opposite portions of the narrow web and of the web in which the widening has been effected can then be united by joining the wales $b^4$ of the opposite webs by means of an ordinary looping-machine or by sewing or in any other available manner, the floating threads $a$ being then removed.

It will be observed that the four wales $b'$, $b^2$, $b^3$, and $b^4$ are continuous, so as to form a band of uniform width along the edge of each widened portion of the web, and it will be further observed that although the widening-wales $a^3$, $a^4$, and $a^5$ are introduced between the wales $b'$ and $b^2$ in the respective courses five, eight, and eleven they do not retain this position, but cross said wale $b'$ and are interlooped with the fifth wale in the succeeding course, so that the eyelet-hole or gap in the knitted web which would otherwise be produced is closed and the appearance of the widened web is not marred by such eyelet-holes.

The manner of producing the above-described knitted web will be understood on reference to Figs. 2 to 5, in which the opposite sets of needles A', $A^2$, $A^3$, $A^4$, and $A^5$ represent vertical needles of a circular-knitting machine, the complete circle being broken by a gap representing eight needles, in place of which there are two sets of horizontal needles, (represented at B', $B^2$, $B^3$, and $B^4$,) these horizontal needles being disposed so as to draw their stitches to the same face of the fabric as the vertical needles and being in this respect the reverse of the needles of the ordinary rib-knitting machine.

Figure 2:
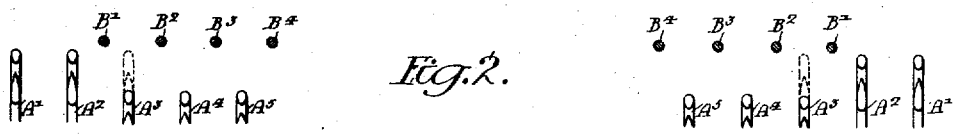

As shown in Fig. 2, each needle B' is between the needles $A^2$ and $A^3$, the needle $B^2$ is between the needles $A^3$ and $A^4$, the needle $B^3$ between the needles $A^4$ and $A^5$, and the needle $B^4$ alongside of the needle $A^5$, and in knitting the narrow web the needles $A^3$, $A^4$, and $A^5$ of each set are out of action, as shown in Fig. 2, the wales $a'$ $a^2$ being formed upon the needles A' $A^2$ and the wales $b'$, $b^2$, $b^3$, and $b^4$ upon the needles B', $B^2$, $B^3$, and $B^4$, the thread being carried across the gap between the needles $B^4$ as the thread-guide rotates, so as to form the floating threads $a$.

Figure 3:
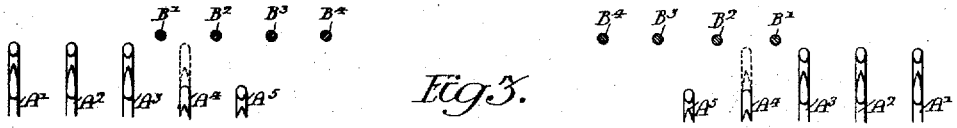

In knitting course five the needles $A^3$ are raised, as shown by dotted lines in Fig. 2, and before knitting course six the sets of needles $B'$, $B^2$, $B^3$, and $B^4$ are moved toward each other to the extent of one needle, as shown in Fig. 3, so as to widen each portion of the fabric to the extent of one wale and cross the wales $b'$ and $a^3$. When the next widening-course, eight, is reached, the needles $A^4$ are brought into operative position, as shown by dotted lines in Fig. 3, and before knitting course nine the sets of needles $B'$, $B^2$, $B^3$, and $B^4$ are again moved toward each other to the extent of one needle, as shown in Fig. 4, so as to effect the crossing of the wales $b'$ and $a^4$, and in knitting course eleven the needles $A^5$ are brought into action, as shown by dotted lines in Fig. 4, the sets of needles $B'$, $B^2$, $B^3$, and $B^4$ being moved toward each other to the extent of one needle before knitting course twelve in order to cross the wales $b'$ and $a^5$. Both sets of needles $A'$ $A^2$, &c., are now in action, and the gap between them is filled by the sets of needles $B'$, $B^2$, $B^3$, and $B^4$, as shown in Fig. 5, so as to produce a continuous web of the desired width.

Figure 7:
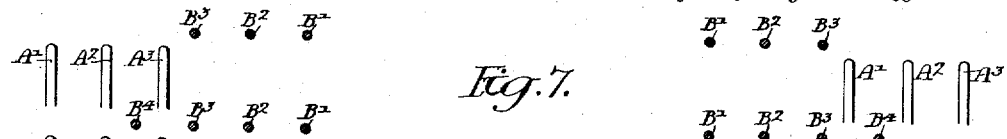
Figure 8:
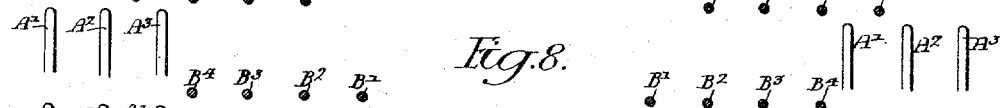
Figure 9:
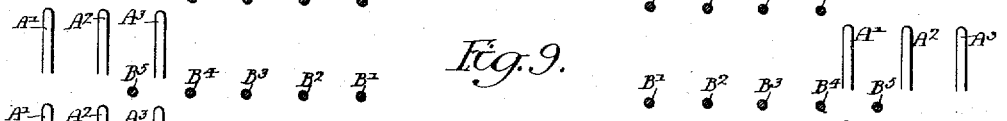
Figure 10:
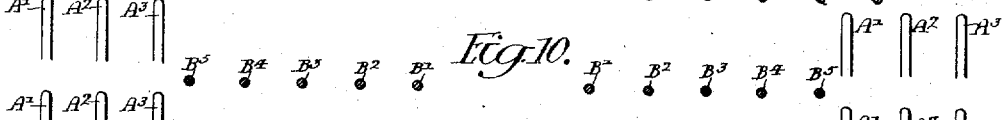
Figure 11:
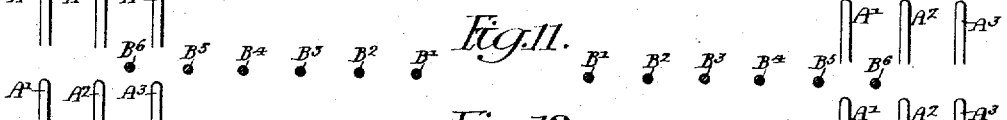
Figure 12:
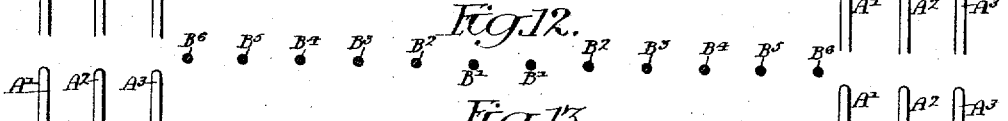
Figure 13:
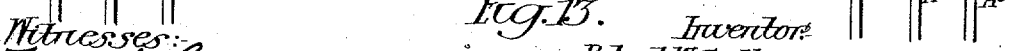

The method of introducing and crossing the widening-wales can be employed in a web in which the bordering band is not of uniform width, or, in other words, in which the widening-wales are not always introduced at the same distance from the edge of the web in the widened portions. A web of this character is shown in Fig. 6, on reference to which it will be observed that the first-introduced wale $b^4$ is the fourth, the second-introduced wale $b^5$ is the fifth, and the third-introduced wale $b^6$ is the sixth from the edge. In this case the widening-wales are formed upon needles of the sets $B'$, $B^2$, $B^3$, $B^4$, $B^5$, and $B^6$. Thus the wales $a'$ $a^2$ $a^3$ $b^3$ $b^2$ $b'$ of courses one, two, three, and four are formed upon the needles $A'$, $A^2$, $A^3$, $B^3$, $B^2$, and $B'$, disposed as shown in Fig. 7. In knitting course five the needles $B^4$ are introduced, as shown in Fig. 8, and before knitting course six the sets of needles $B'$, $B^2$, $B^3$, and $B^4$ are shifted toward each other to the extent of one needle, as shown in Fig. 9. In knitting course eight the needles $B^5$ are introduced, as shown in Fig. 10, and before knitting course nine the sets of needles $B'$, $B^2$, $B^3$, $B^4$, and $B^5$ are again shifted toward each other to the extent of one needle, as shown in Fig. 11, and in like manner needles $B^6$ are introduced, as shown in Fig. 12, before knitting course eleven, and the sets of needles $B'$, $B^2$, $B^3$, $B^4$, $B^5$, and $B^6$ are shifted to the position shown in Fig. 13 before knitting course twelve.

Figure 16:
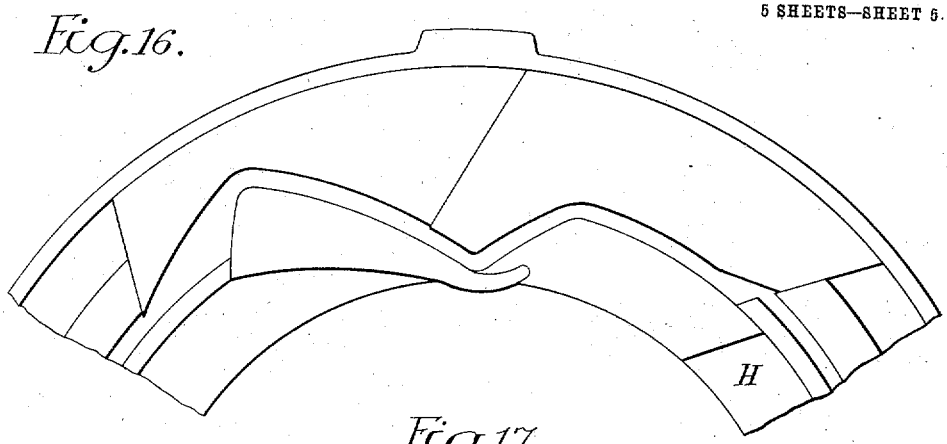
Figure 17:
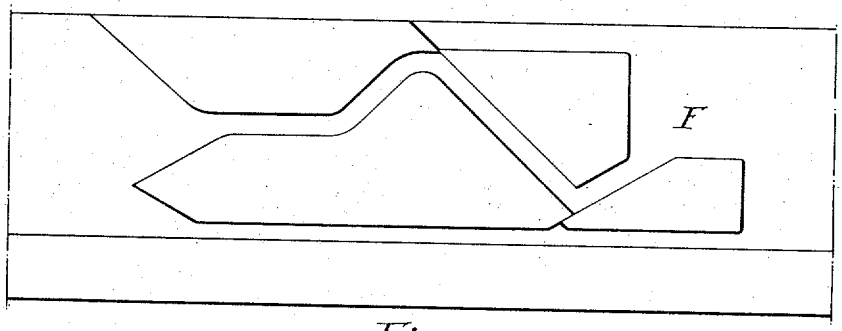

The machine for carrying out the method of knitting above described with reference to Figs. 2 to 5 is shown in Figs. 14, 15, 16, and 17, on reference to which it will be observed that D represents a vertical needle-cylinder, which is suitably grooved for the reception of the A needles; F, a rotary cam-cylinder, and G G a pair of segments mounted upon a ring $d$, secured to the needle-cylinder D, said segments being adjustable from and toward each other and having end portions suitably grooved for the reception of the B needles. Above the segments G and mounted so as to be rotated thereon by an arm $F'$ of the cam-cylinder F is a cam-ring H, which has cams—such, for instance, as shown in Fig. 16—for acting upon the B needles carried by said segments, so as to advance and retract said needles, the cam-cylinder F having the usual cams—such, for instance, as shown in Fig. 17—for advancing and retracting the A needles carried by the needle-cylinder D. The bits of the needles upon which the widening-wales are to be produced pass behind the knitting-cams of the cam-cylinder F, as shown in Fig. 14, so that said needles will not be operated in order to knit. By raising either of these needles, however, so that its bit $i$ is brought into range of the knitting-cams of the cam-box the needle is thrown into action and the knitting proceeds upon the same as upon the other needles. A shaft K, mounted in suitable bearings upon the ring $d$, has cam-wheels $m$, which act upon toothed wheels $m'$, carried by vertical shafts $n$, which have spur-wheels $s$ engaging with racks $s'$ upon the segments G, any suitable provision being made for operating the shaft K by intermittent movements of partial rotation. Normally—that is to say, during the knitting of the narrow web—the segments G occupy the position shown in Fig. 14, and the widening-needles at each end of the cylinder set are depressed, so as to be out of action.

When it is desired to begin the widening operation, intermittent movements of partial rotation are imparted to the shaft K, and just before the action of the cam-wheel $m$ effects the first movement of the segments G toward each other the first pair of inoperative needles of the cylinder set are moved to operative position either by hand or by any suitable automatic mechanism, the lateral shifting of the segments G being effected after the knitting of the course in which these needles draw stitches, thus shifting the segment-needles so as to cross the wales.

The movements of the shaft K are so timed that the desired number of courses will be knitted before the cam-wheel $m$ acts upon the wheel $m'$, and just prior to such action the next pair of needles of the cylinder are lifted into action and have stitches formed upon them, the segments G being then again moved toward each other to the extent of one needle, so as to cross the wales, and these operations being repeated until the desired number of widening-courses have been knitted.

After the desired width of widened fabric has been knitted and it is desired to restore the segments G to the position shown in Fig. 14 the stitches should be cast off of the widening-needles of the cylinder D, an operation which can be readily effected by throwing into action a cam—such, for instance, as that shown in Fig. 18—said cam being located on the cam-cylinder F at a point remote from the thread-guide and being constructed so as to act only on supplementary bits *i'* of said widening-needles, the latter being thereby advanced and retracted in order to cast their stitches without catching any new thread, the retraction of the needles being to the lowermost or inoperative position, so that they will remain out of action until the widening operation has to be again performed. The fabric is then severed at a point between the segments G throughout such length that the segments can be retracted to any desired extent, and the segment-needles being drawn in said segments are then racked back again into their separated positions, as shown in Fig. 14, and the operation of knitting narrow web is resumed.

Figure 19:
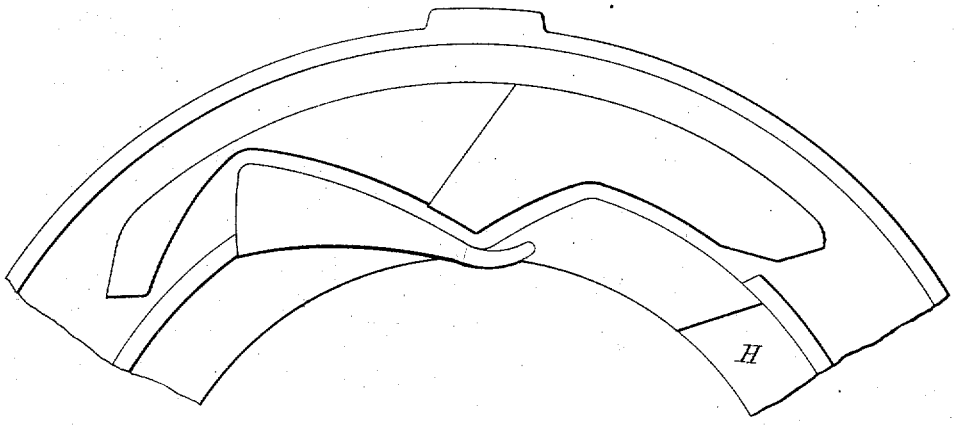

In constructing the machine for knitting the fabric shown in Fig. 6 the cams on the cam-ring H should be so constructed—as shown, for instance, in Fig. 19—that the needles of the segments G can be thrown into or out of action, all of the needles of the cylinder set being active needles.

Although I have described my invention as applied to a circular-knitting machine having a rotating thread-guide, it will be evident that it may be applied to circular machines in which the thread-guide has a back-and-forth motion, so as to form selvages on the end needles of the set of needles carried by the cylinder, or it may be applied to straight machines having reciprocating thread-guides. Hence in some of the claims I have used the term "main needle-carrier" to indicate that element of the machine which in the drawings is represented by the cylinder D and the term "supplementary needle-carrier" to indicate that element of the machine which is represented by the segments G; but where in the claims I specifically mention a "rotary knitting-machine" having a "needle-cylinder" I mean a knitting-machine in which the travel of the thread-guide or needles relatively to each other is rotary—that is to say, always in one direction—resulting in the production of a fabric tube with floating threads *a*, Figs. 1 and 6, in the narrow part of the web, so as to distinguish from a machine in which the moving parts have a back-and-forth motion, resulting in the production of a web with selvages.

It will be understood that the number of needles carried by the segments G may be varied in accordance with the desired number of wales in the band which borders the widened portion of the web, and in like manner the number of widening-needles of the cylinder may be varied to accord with the desired number of widening courses to be introduced into the web.

Having thus described my invention, I claim and desire to secure by Letters Patent—

1. The combination of the main needle-carrier, with a supplementary needle-carrier having needles which draw stitches to the same face of the fabric as those of the main needle-carrier, means for actuating the needles, provision for permitting movement of certain of the needles of one of said carriers into operative position before lateral movement of the supplementary needles, and provision for laterally moving the supplementary needle-carrier.

2. The combination of the main needle-carrier having needles some of which are movable into and out of operative position, a supplementary needle-carrier having needles which draw stitches to the same face of the fabric as those of the main needle-carrier, means for actuating the needles, provision for permitting movement of certain of the needles of the main needle-carrier into operative position before lateral movement of the supplementary needles, and provision for laterally moving said supplementary needle-carrier.

3. The combination in a rotary knitting-machine, of a needle-cylinder, a segment carrying a series of needles for producing the wales of a bordering band, said segment being mounted so as to move part way around said cylinder, provision for moving needles of one of said needle-carrying elements into and out of operative position, and provision for laterally moving the needle-carrying segment in respect to the cylinder.

4. The combination in a rotary knitting-machine, of a needle-cylinder having needles some of which are movable into and out of operative position, a segment carrying a series of needles for producing the wales of a bordering band, said segment being mounted so as to be movable part way around said cylinder, and provision for laterally moving the needle-carrying segment in respect to the cylinder.

5. The combination in a rotary knitting-machine, of a needle-cylinder, a pair of needle-carrying segments mounted so as to be adjustable from and toward each other around said cylinder, provision for moving needles of one of said needle-carrying elements into and out of operative position, and provision for moving said needle-carrying segments from and toward each other.

6. The combination in a rotary knitting-machine, of a needle-cylinder having needles some of which are movable into and out of operative position, a pair of needle-carrying segments mounted so as to be movable from and toward each other around said cylinder, and provision for moving said segments from and toward each other.

7. The combination in a knitting-machine, of a main needle-carrier, a supplementary needle-carrier, provision for permitting movement of needles of one of said carriers into and out of operative position, provision for laterally moving the supplementary needle-carrier, and a cam whereby certain of the needles of one of said carriers may be projected and retracted so as to cast a series of adjoining stitches at one operation.

8. The combination in a knitting-machine, of a main needle-carrier having needles some of which are movable into and out of operative position, a supplementary needle-carrier, provision for laterally moving the same in respect to the main needle-carrier, and a cam whereby certain of the needles of said main carrier can be operated so as to cast a series of adjoining stitches at one operation without affecting the stitches upon the remaining needles.

9. The combination in a rotary knitting-machine, of a needle-cylinder carrying an interrupted series of needles, segments carrying needles adapted to fill the space between the needles of the cylinder set, certain of the needles being capable of being moved into and out of operative position, and provision for laterally moving the segments in respect to the needles of the cylinder.

10. The combination in a rotary knitting-machine, of a needle-cylinder carrying an interrupted series of needles, certain needles at each end of the set being capable of being moved into and out of operative position, segments carrying needles which coöperate with those of the cylinder, and provision for racking said segments so as to cause them to approach or recede from each other.

In testimony whereof I have signed my name to this specification in the presence of two subscribing witnesses.

ROBERT W. SCOTT.

Witnesses:
JOS. H. KLEIN,
HARRY SMITH.